MULTIPLE GLASS SHEET GLAZING UNITS AND THEIR MANUFACTURE

Filed May 22, 1968 3 Sheets-Sheet 1

INVENTORS
Paul N. Arendt,
Harry N. Dean and
BY Glen J. Lehr
Collins & Oberlin
ATTORNEYS Jan. 26, 1971 P. N. ARENDT ET AL 3,557,400

MULTIPLE GLASS SHEET GLAZING UNITS AND THEIR MANUFACTURE

Filed May 22, 1968 3 Sheets-Sheet 2

INVENTORS
Paul N. Arendt,
Harry N. Dean and
Glen J. Lehr
BY
Collins & Oberlin
ATTORNEYS INVENTORS
Paul N. Arendt,
Harry N. Dean and
Glen J. Lehr
BY
Collins & Oberlin
ATTORNEYS United States Patent Office 3,557,400

Patented Jan. 26, 1971

1

3,557,400
MULTIPLE GLASS SHEET GLAZING UNITS AND THEIR MANUFACTURE

Paul N. Arendt, Columbus, Harry D. Dean, Perrysburg, and Glen J. Lehr, Lucas County, Ohio, assignors to Libbey-Owens-Ford Company, a corporation of Ohio Filed May 22, 1968, Ser. No. 731,128
Int. Cl. C03c 27/04; F27b 9/06
U.S. Cl. 16—2 15 Claims

ABSTRACT OF THE DISCLOSURE

Method and apparatus for automatically handling and treating tubular metal inserts for use in forming the dehydration holes in all-glass multiple sheet glazing units in a substantially continuous manner. Metal inserts, coated with a semi-fused glass glazing, are fed to a plurality of support elements arranged in a circular pattern upon a rotatable table, means being provided for intermittently rotating said table to index the support elements beneath metal insert loading means to receive inserts thereon, then to a heating means where the glazed coating is completely fused by electric high-frequency induction heating, and finally to an unloading means which removes the inserts from the support elements.

The present invention relates broadly to multiple glass sheet glazing units and their manufacture, and more particularly to an improved method and apparatus for treating the tubular metal inserts used to form dehydration holes in such units.

In the production of multiple glass sheet glazing units, one method involves supporting two sheets of glass in spaced face-to-face parallel relation, heating the marginal edge portions of the glass sheets to softening temperature, and then rolling the heat-softened edge portions to fuse them together to form a continuous edge wall around the unit. As this operation continues around the periphery of the two sheets of glass, an air space is formed therebetween which must be subsequently dehydrated and hermetically sealed to provide the desired insulating and condensation-preventing qualities of such units. Communication with this air space is maintained by the use of at least one tubular metal insert or grommet which is sealed into the edge wall of the unit as the edge portions of the glass sheets are fused together to provide a dehydration hole. The normal moisture-containing air is flushed from the interior of the unit through the tubular insert and replaced with dry air or gas. The unit is then hermetically sealed by plugging or otherwise closing the hole in the metal insert.

As disclosed in U.S. Pat. No. 3,027,607, it is important, in order to maintain a suitable sealing relationship, that the thermal expansion characteristics of the metal insert closely approximate those of the glass sheets, and a number of examples are given in said patent. Also, that best results can be obtained by coating the metal inserts with a glass of the same composition as that of the glass sheets. Reference is made to said patent for examples of glass compositions that may be used.

While the procedure disclosed in the above patent has proven effective in applying a glass coating to the surface of the metal inserts, it has been discovered that an even more satisfactory bonding of the glass coating to the surface of the metal inserts can be obtained by the improved procedure of this invention.

It is, therefore, a primary object of the present invention to provide an improved tubular metal insert for use in forming the dehydration hole in all-glass multiple sheet glazing units, and more especially to a novel method for

2 handling and treating the metal inserts to increase the adherence of the glass coating thereto.

Another object of the invention is to provide a method of treating the surface of the tubular metal inserts to form thereon a layer of an oxide of the metal which serves to more effectively bond the glass coating to the metal insert.

A further object of the invention is to provide apparatus for automatically handling and treating metal inserts to form the glass coating thereon in a substantially continuous manner.

A still further object of the invention is to provide apparatus of this character embodying means for successively loading metal inserts on support means, and means for transferring said metal inserts to a heating means where they are subjected to electric high-frequency induction heating, and then to an unloading means which removes the metal inserts from said support means.

Other objects and advantages of the invention will become more apparent during the course of the following description when read in connection with the accompanying drawings.

In the drawings, wherein like numerals are employed to designate like parts throughout the same:

Figure 1:
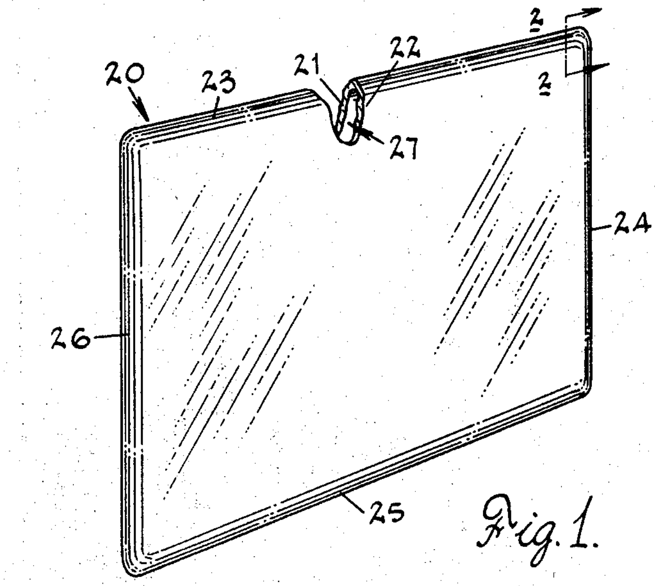
FIG. 1 is a perspective view of an all-glass multiple sheet glazing unit.
Figure 2:
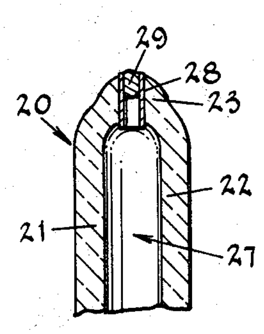
FIG. 2 is a cross-sectional view of the glazing unit taken on line 2—2 of FIG. 1, showing a sealed dehydration hole in the edge wall thereof.
Figure 3:
FIG. 3 is a perspective view of a tubular metal insert used in the formation of the dehydration hole.

With reference now to the drawings and particularly to FIGS. 1 and 2, there is illustrated an all-glass multiple sheet glazing unit 20 which comprises two sheets of glass 21 and 22 spaced from one another in face-to-face parallel relation by edge wall portions 23, 24, 25 and 26 to create an air space 27 therebetween. As indicated by the numeral 28 in FIG. 2, at least one of the wall portions, such as the wall portion 23, is provided with at least one tubular metal insert or grommet 28 that is sealed into the said edge wall as it is being formed. This tubular metal insert forms an access hole into the air space 27 for dehydration of the same after which the insert can be closed by a plug or body of solder 29 to hermetically seal the unit. Depending upon use of the glazing unit, it may be found advantageous to employ two metal inserts located in one edge wall portion or in two oppositely disposed edge wall portions.

Multiple sheet glazing units of the type shown in FIGS. 1 and 2 have been produced according to the method and apparatus disclosed in U.S. Pat. No. 3,257,187, the pertinent portions of which are diagrammatically illustrated at 30 in FIG. 14. Thus, a pair of glass sheets 21 and 22, supported in spaced face-to-face parallel relation, are carried through the concentrated heat of fusing burners 301 which progressively soften the marginal edge portions of the sheets until they are substantially semi-plastic. The heat-softened edge portions are then passed between a pair of forming rolls 302 which urge said edge portions together into fused contact with one another to produce a sealed peripheral edge wall. During the formation of at least one edge wall portion, a tubular metal insert or grommet 28 is accurately introduced into position between the highly-heated marginal edge portions of the sheets and, with the pressure exerted by the forming rolls 302, is sealed into the edge wall. As graphically illustrated in FIG. 14, the metal insert is supported and carried by an arm 303 from a position adjacent a heating burner 304 into a position for insertion between the glass sheets as indicated by the arrow designated by the letter F. Preheating of the metal insert to a condition of redness is believed to be important to heat-soften the glazed coating thereon prior to being welded between the glass sheets. Preferably, this is carried out in a hydrogen flame immediately before fusion with the glass sheets to reduce the possibility of contaminating the surface of the metal insert with particles of carbon that could adversely affect satisfactory bonding of the heated insert to the glass.

It is recognized in the teaching of U.S. Pat. No. 3,027,607 that the tubular metal insert or grommet 28 can be formed from certain metals, or alloys of such metals, having thermal expansion characteristics compatible with those of the composition of the glass sheets. Thus, metal inserts of nickel-iron and nickel-iron-cobalt alloys, by way of example, have been satisfactorily employed. The tubular metal inserts are then prepared for use by applying to the outer surfaces thereof a glazed coating that is bonded thereto.

Most of the multiple glass sheet glazing units of the type with which this invention is concerned are made of conventionally produced soda-lime-silica glasses. It has been found that best results can be obtained in sealing the metal inserts between the glass sheets when a glazed coating of the same composition as that of the glass sheets is employed.

Initial treatment of the metal inserts is, of course, required to properly prepare the outer surface thereof before the glazed coating is applied. Such treatment includes conventionally known procedures to thoroughly clean the surfaces of the inserts; removal of foreign particles from particularly their outer surface, and "heat-soaking" to decarburize the metal of the inserts.

Following this treatment, the outer surface of the inserts is impacted with a solid form of the glazing material to be applied. Such impact application can be carried out by any one of several methods but a preferred method consists in placing a quantity of the metal inserts in a tumbling apparatus with small pieces of hard glass of the desired composition. After the glass pieces and metal inserts have been tumbled together for a predetermined period of time, the glass pieces will become pulverized and the metal inserts will be found to have not only become completely coated with glass particles or finely powdered frit but a certain amount thereof will have been partially embedded in the surface of the metal.

This treatment, as described in the aforementioned patent, includes:

(1) Filling the chamber of a ball-mill approximately ¾ full with cut or broken squares of the suitable glass composition (3/16–7/32 inches in thickness; ½–¾ inch squares).

(2) Adding a quantity of metal inserts into the chamber and tumbling for about 5 hours.

(3) Screening out the powder glass-coated inserts.

Figures 4, 5, 13, 14:
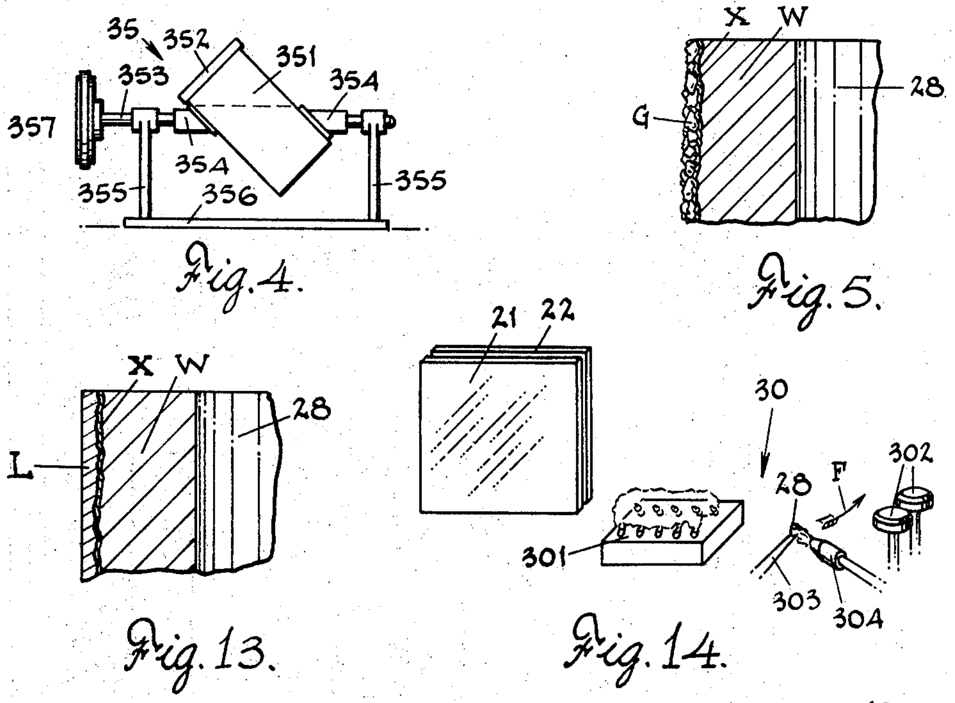
FIG. 4 is a side elevation of a ball-mill in which the outer surfaces of the metal inserts receive an impacted layer of glass particles.
FIG. 5 is an enlarged, fragmentary cross-sectional view of the wall of a metal insert with a semi-fused glass layer thereon.
FIG. 13 is a view similar to FIG. 5 but showing the glass layer on the metal insert after it has been completely fused.
FIG. 14 is a diagrammatic view of apparatus for producing an all-glass multiple sheet glazing unit having a tubular metal insert in an edge wall thereof.

By way of example, one form of tumbling apparatus or ball-mill 35 is illustrated in FIG. 4 and will be seen to comprise a substantially cylindrical chamber 351 open at one end and over which opening a removable cover 352 can be tightly fitted. The cylinder 351 is carried by the aligned sections of an axle 353; said aligned sections being attached to the cylinder in diagonally disposed relation by hubs 354. The extremities of the axle are journaled in a pair of oppositely disposed upright supports 355 fixed to a base 356; said axle being driven by a pulley 357 powered by a motor (not shown). Rotation of the axle 353 tumbles or agitates the contents of the cylindrical chamber 351, thereby providing continuous impacting of the surfaces of the inserts by the glass.

After the metal inserts are removed from the ball-mill 35, they are introduced into an oven and heated at a temperature of about 1180° F. for 15 to 20 minutes to reduce the glass particles to a semi-fused coating. This can be carried out while the inserts are supported in stainless steel mesh trays.

It has been found that during this heating a layer of the oxide of the metal will be formed on the outer surface of the metal insert. It has also been found that the metal oxide layer acts to improve adherence of the glass coating to the surface of the metal insert. Thus, as illustrated in FIG. 5, the outer surface of the wall W of the metal insert is provided with a layer X of oxide of the metal to which is adhered the semi-fused glass coating G. Now, to obtain the benefits of the layer of metal oxide, care must be taken to ensure that it will not be destroyed during the subsequent complete fusion of the semi-fused glass coating G into a layer of hard glass.

This invention, therefore, contemplates a further heat treatment of the metal inserts in a manner to completely fuse the glazing composition under conditions that will effectively prevent loss of the metal oxide layer. This is herein accomplished by apparatus and according to a method which will now be described in detail. Generally stated, however, the apparatus comprises a table rotatable about a vertical axis, means carried by the table for supporting metal inserts, feeding means for delivering individual inserts to the support means, means for subsequently heating the metal inserts, means for removing them from the support means, and means for intermittently indexing the table to bring the support means successively to said feeding means, heating means and unloading means automatically and in a substantially continuous manner.

METAL INSERT SUPPORT UNIT

The metal insert support unit 40 is mounted in the central area of a platform 401 supported by pedestals 402 at the corners thereof.

The support unit comprises a rotary table 41 that is adapted to be rotated clockwise in the direction of the arrow indicated by the letter C, by a substantially automatic progression of step-wise movements. As will be hereinafter more fully explained, the rotary table 41 of the support unit is thus turned in increments of movement in a circular path and this distance, by way of example, is in the angular amount of 10°. For this purpose, the unit 40 also includes a power means 43 (FIG. 12) and a source of power 44 for driving the rotary table 41. The table consists of a circular plate 411 equipped around its periphery with a plurality of metal insert support elements or members 412 which are spaced apart a distance equal to the angular increment of movement of the circular plate 411, which, as above stated, is preferably an angle of 10°. Each support element 412 is substantially cylindrical having a mounting portion 413 that is received in a bore 414 (FIG. 7) in the plate 411 and secured by a set-screw 415. Above the base portion 413, each support element is formed with a base portion 416 of larger diameter, resting on the upper surface of the plate, and annular portion 417 of a reduced diameter equal to the outer diameter of a tubular insert or grommet 28 and an upper terminal or pin portion 418 having a diameter slightly smaller than the inner diameter of an insert.

Figures 7, 9, 10, 11:
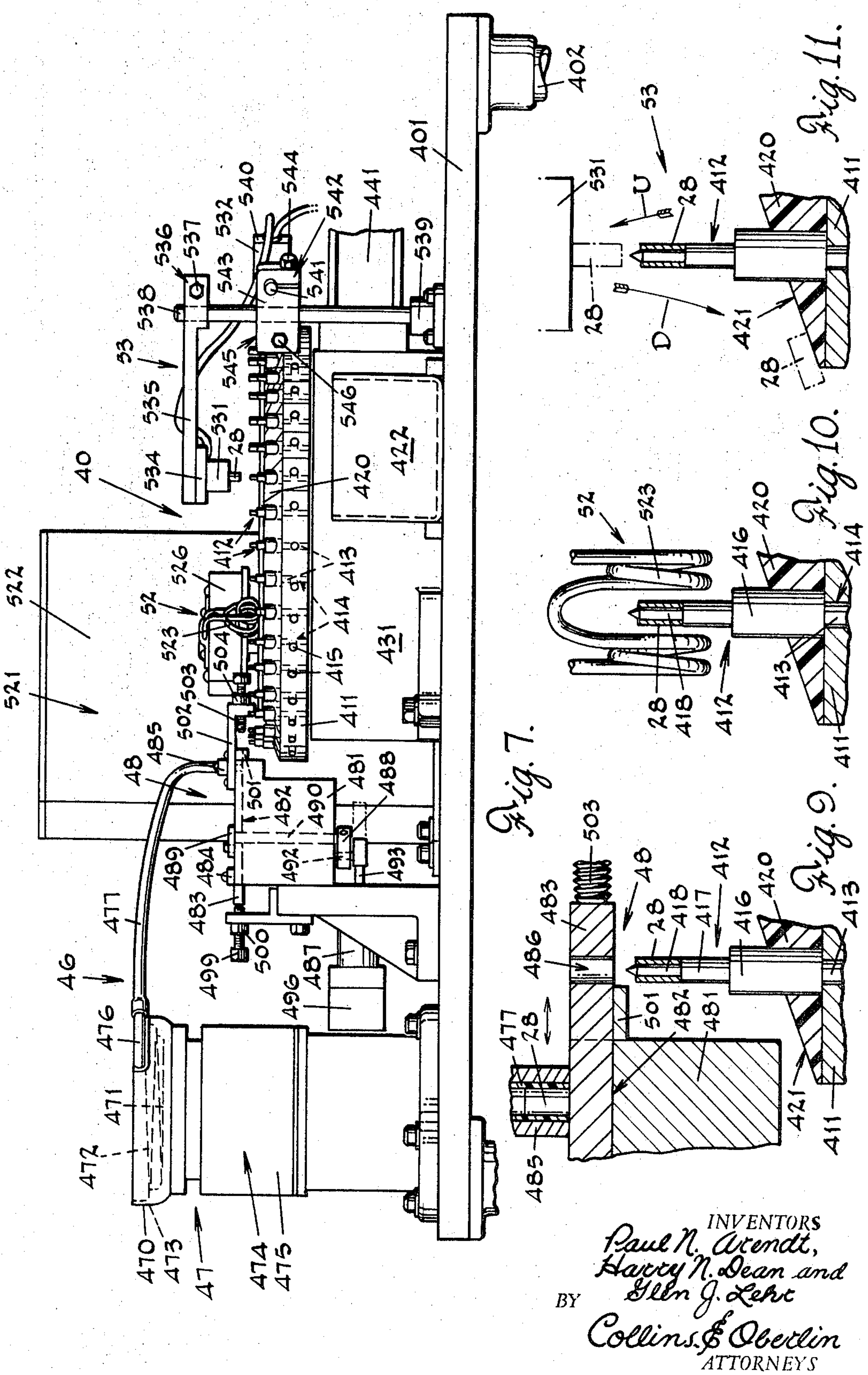
FIG. 7 is a front elevation of the apparatus.
FIG. 9 is an enlarged detail view of the metal insert loading unit.
FIG. 10 is an enlarged detail view of the heating unit.
FIG. 11 is an enlarged detail view of the unloading unit.

When the support elements are halted in succession at the loading station 46, an insert 28 will be delivered onto the pin portion 418 while preceding inserts will be carried through the heating station 52 and then to the unloading station 53 where they are raised from the related support element and discharged into a suitable receptacle. As best seen in FIG. 9, each base portion 416 is received in an annular ring 420 of a suitable plastic material that is secured to the plate 411 and has a downwardly and outwardly inclined upper surface 421. As the inserts are removed from the pin portions 418 at the unloading station 53, they fall onto the inclined surface 421 and are directed to a receptacle 422 in the unloading station 53.

The annular plate 411 is fixed to the upper end of the vertical shaft 430 of the rotary power means 43 which is suitably journaled in the case 431 thereof. As illustrated diagrammatically in FIG. 12, the shaft 430 is an integral component of a mechanical drive having an annular toothed ratchet 432 and a reciprocally mounted pawl 433 having a power stroke sufficient to turn the plate 411 stepwise through increment areas of 10°. A locking dog or bolt 434 is adapted to prevent slippage or other movement of the plate 411 during the periods it is halted.

The pawl 433 is connected by a link 435 to the source of power 44 which comprises a cylinder 441 containing a piston 442 and a rod 443 attached at its outer end to the link. The opposed ends of the cylinder are selectively connected through a valve 444 to a source of power to advance and retract the pawl 433. By means of pipe 445, the direction of pressure from the valve 444 to the head end of the cylinder to advance the pawl will also supply pressure by pipe 446 to the rod end of a cylinder 447, the piston rod 448 of which is attached to the locking bolt 434. Consequently, as the pawl 433 advances toward the teeth of the ratchet to turn the same, the locking dog or bolt 434 will be retracted to permit such turning action. Likewise, when pressure is directed to the rod end of cylinder 441 by pipe 449 to retract the pawl 433, pressure will also be communicated by pipe 450 to the head end of cylinder 447 to return the locking bolt 434 to its locking position. In this way, the empty support elements 412 will be advanced in stepwise manner from the unloading means 53 toward the loading station 46 while insert support elements will be successively moved toward and through the heating means 52 and thence to the unloading means 53.

LOADING UNIT

Figure 6:
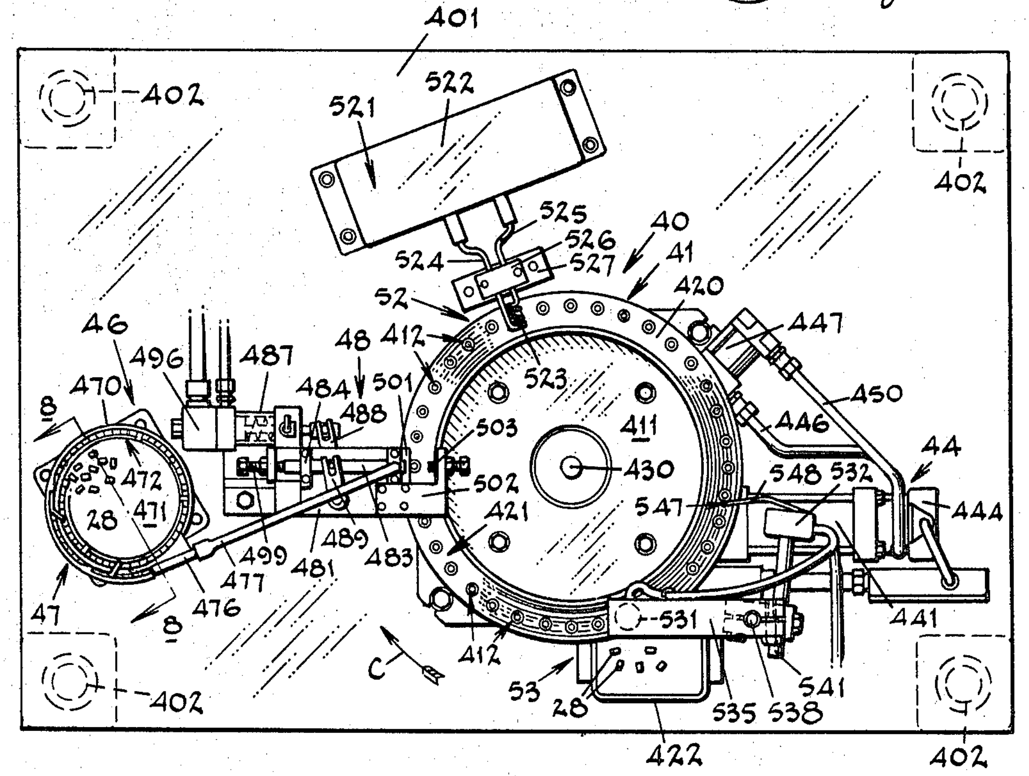
FIG. 6 is a plan view of apparatus provided by the invention for handling and treating the tubular metal inserts.

Generally stated, the loading unit 46 which supplies metal inserts to successive support elements operates during the same interval of time that is assigned for heating of the inserts and while the work support unit is halted. The loading unit is best shown in FIGS. 6, 7 and 8 and includes a source of supply 47 and a feeder device 48 between said source and the support elements 412 carried by the rotary plate 411.

Figure 8:
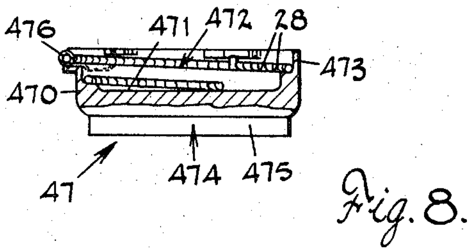
FIG. 8 is a sectional view of a metal insert supply unit taken on line 8—8 of FIG. 6.

The source of metal insert supply 47 comprises an annular bowl-shaped container 470 having a floor 471 and upwardly spiraling ledge or shelf 472 extending inwardly from the vertical wall 473 (FIG. 8). The container 470 is a structural part of a vibration generating means 474 within a case 475 that is adapted to transmit vibratory energy along an arcuate path through the floor 471. One vibration generating means which can be used is that manufactured by the Syntron Company of Homer City, Pa., under the manufacturer's designation of Model EB–00 Type C.

When a quantity of metal inserts are freely deposited on the floor 471 of the container 470 and vibrated in this manner, they are caused to approach the ledge 472 and move along a similar arcuate or circular path such that they are caused to move toward and enter the surface of the inclined ledge and gradually be impelled upwardly to an exit sleeve 476 connected by tubing 477 to the feeder unit 48.

The feeder unit 48 comprises a base 481 secured to the platform 401 and provided in its upper surface with a groove 482 for a transfer bar 483. The bar is slidably confined at one end in the groove by a plate 484 and at its opposite end by a plate 485 that is formed to receive the end of the previously-mentioned piece of tubing 477. As best illustrated in FIG. 9, the bar 483 is provided with a vertically disposed hole 486 which, in the retracted position of the bar, is aligned with the end of tubing 477 to receive a metal insert therefrom.

The bar 483 is moved forwardly to deliver a tubular insert 28 from the tubing 477 to a support element 412 on the rotary table 411 by a pneumatic cylinder 487, mounted on the base 481, through levers 488 and 489. The lever 488 is carried at the lower end of a vertically disposed shaft 490 journaled in the base 481 and having a bifurcated end 491 (FIG. 12) for receiving a pin 492 on the end of the piston rod 493 of cylinder 487. The lever 489 secured to the upper end of shaft 490 also has a bifurcated end 494 to receive a pin 495 fixed to the bar 483.

The piston rod 493 is adapted to produce forward movement of the bar 483 during application of pressure to the head end of cylinder 487 from a control valve 496 and to produce rearward movement by means of a coil spring 497 acting against the opposite side of the contained piston 498. The exact distance of movement of the transfer bar 483 is determined by a set-screw 499 having a lock-nut 500 which limits rearward movement to accurately locate the opening 486 in alignment with the end of the tubing 477. In this connection, it will be noted in FIG. 9 that a metal insert in the hole 486 of the transfer bar 483 is supported by the ledge 501 of a bracket 502; the width of the ledge being such that a metal insert or grommet will be retained in the hole 486 until its axis is aligned with the axis of the pin portion 418 of a support element 412 therebeneath. This automatic positioning of the inserts can be adjusted by a set-screw 503, threaded in the bracket 502 at the opposite end of the base 481 and having a lock-nut 504, which is engaged by the bar to limit its forward movement. The limit of movement is determined by exact vertical alignment of the hole 486 with the vertical pin 418 of the support element 412.

As will be hereinafter more fully explained, the successive feeding of the metal inserts to the support elements occurs substantially simultaneously with the heating of a preceding metal insert and during the interval in which step-wise movement of the rotary support unit 41 is halted.

HEATING UNIT

When the metal inserts with the semi-fused glass coatings thereon reach the heating means 52, the glass coating is adapted to be completely fused, the purpose being to improve uniformity of the coating and its adherence to the metal insert. Further, this heating is effected in such a manner as to preserve the oxide layer previously formed on the metal insert.

The source of heating at the heating means comprises conventionally known electrical components 521 that are contained in a housing 522 mounted on the platform 401, and will be generally understood to include an electrical system for producing a high-frequency induction heating effect in the field of a linear coil 523 which is disposed in the circular path of movement of the support elements 412. As herein shown, the lead portions 524 and 525 between the source and the coil 523 are supported by a block of insulation 526 on a bracket 527.

As metal inserts with semi-fused coatings thereon are successively halted within the coil 523, as viewed in FIG. 10, they are heated to a temperature approximating the melting temperature of the coating material. By the use of electric high-frequency induction heating, the metal insert can be substantially instantaneously heated to completely fuse the glass coating in a matter of seconds. Thus, it has been found that when heated at a temperature of about 1980° F. for about 2 to 3 seconds, complete fusion of the glass coating will be obtained and without destroying the metal oxide layer on the metal insert. Such rapid heating will complete the fusion of the glass coating before "burning off" of the metal oxide occurs. This is not possible where the coated metal inserts are externally heated, due to the fact that the insulating properties of the glass glazing would require a higher temperature over a longer period of time, which would result in the oxide layer being destroyed or "burned off."

UNLOADING UNIT

As the glazed metal inserts are successively removed from the linear coil 523, they are cooled as they pass to the unloading means designated by the numeral 53. Broadly stated, this station includes a magnetic device 531 which is adapted to attract and strip a metal insert upwardly from the pin portion 418 of a support element 412 when the device is energized and the rotary support unit 41 is halted. After the insert is removed and during movement of the unit 41 one increment of its stepwise rotation, means, such as a switch device 532, is actuated to open the circuit through and thus temporarily deenergize the magnetic device 531 thereby causing it to release the attracted metal insert for delivery into the receptacle 422.

The magnetic device 531 is secured to a mounting block 534 of insulating material carried by a horizontal arm 535 having a slotted outer end 536 adjustably secured by a set-screw 537 on a vertical post 538 mounted on the platform 401 by a bracket 539. A preferred elevation of the lower surface of the magnet above the support elements 412 can thus be established to permit said members to freely pass there-beneath while the insert or grommet is magnetically held to its lower surface.

As viewed in FIG. 6, the case 540 of switch device 532 is carried by an arm 541 that is clamped in the slotted end 542 of a block 543 by a set-screw 544. In turn, the block 543 has an oppositely disposed slotted end 545 by which it is secured on the post 538 by a set-screw 546. This arrangement permits the case 540 to be adjusted radially and longitudinally in a horizontal plane as well as upwardly or downwardly in a vertical plane. By these adjustments, it is possible to locate the free end or tip 547 of an outwardly spring-biased lever 548 of the switch device 532 in such relation to each of the support elements 412 that, during their rotation in a circular path with the plate 411, the lever will be depressed to open the switch. Thus, the magnetic device 531 will be temporarily deenergized while the plate 411 is moving and will again become energized when the tip 547 is disengaged from the immediate support member and the lever 548 thereby released.

These actions are diagrammatically shown in FIG. 11 wherein a metal insert support element 412 has approached and stopped beneath the magnet 531. Since this device is presently energized, the metal insert 28 will be drawn upwardly in the direction of the arrow designated by the letter U. While, however, the plate 411 is being rotated substantially half-way in its forward stepwise movement, the lever 548 will be sufficiently depressed to deenergize the magnet 531 thereby releasing the engaged insert whereupon it will automatically fall in the direction of the arrow designated by the letter D and drop upon the inclined surface 421 of the ring 420 which will direct it into the receptacle 422.

OPERATION

Figure 12:
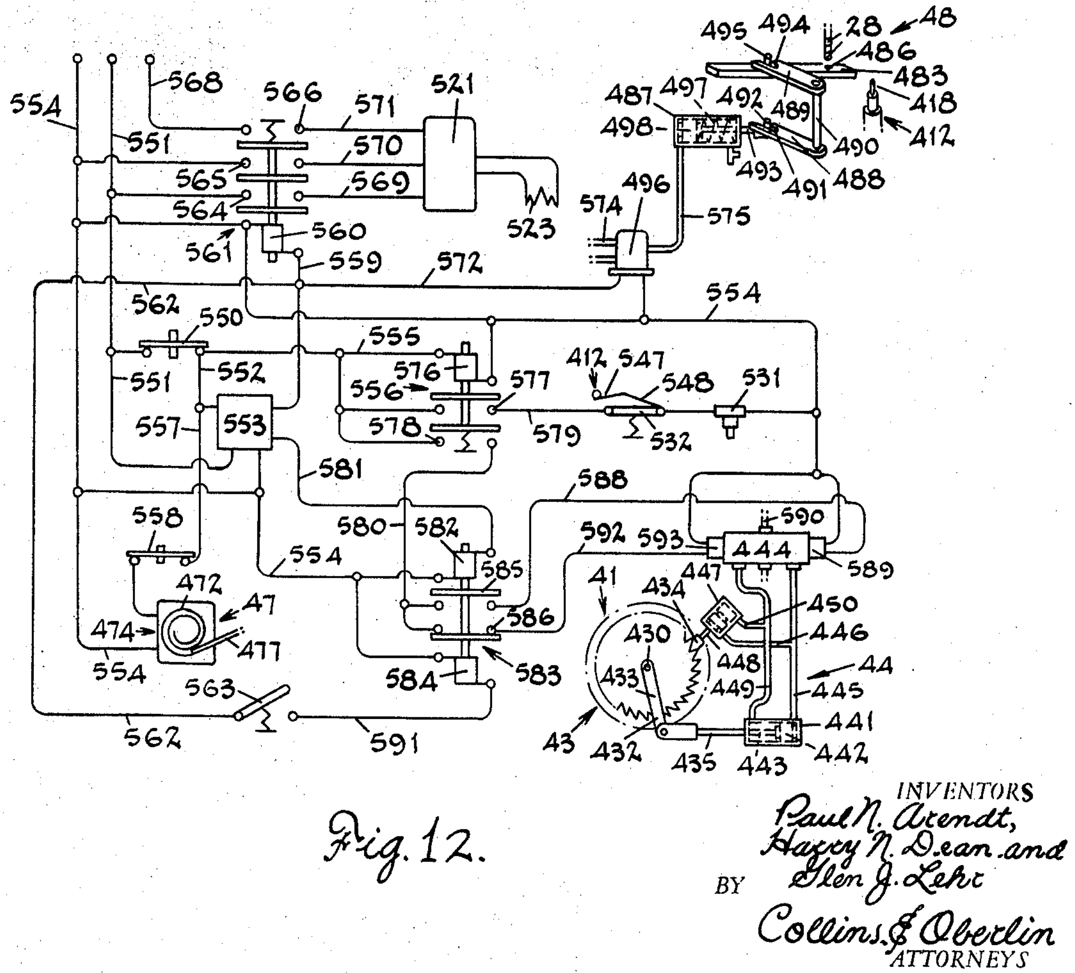
FIG. 12 is a diagrammatic view of an electric control system for automatic operation of the apparatus.

Referring now to FIG. 12, there is shown an electrical system for producing sequential operation of the apparatus above described in a substantially automatic manner. This reduces manual handling of the metal inserts or grommets during the final glazing operation to a minimum. Thus, a manual (on-off) switch MS 550 is adapted to complete a circuit from source line 551 by line 552 (1) to a timing relay TR 553, in series with the source lines 551 and 554, (2) line 555 to a spring-biased relay switch RS 556 and (3) line 557 through a manual (on-off) switch MS 558 to the vibratory device 474.

Upon closure of the manual switches MS 550 and MS 558, the vibratory device 474 will operate to cause movement of a supply of metal inserts in the container 470 spirally upward along the ledge 472 until a continuous train is formed and fed into the tube 477. If desired, provision can be made to initially also operate the rotary unit 41 nad the feeding unit 48, independently of the heat source 521, until a sufficient number of support elements 412 are supplied with metal inserts and approaching the heating station 52. Upon closing of MS 550, the circuit of line 552 energizes TR 553 which, during a first phase of operation, simultaneously activates the heating source 521 as well as the feeding unit 48 and then in a second phase produces operation of the source of power 44 for the rotary unit 41. Thus TR 553 is adjusted for an interval of about 3 seconds to initially complete the circuit of line 559 through the solenoid 560 of spring-biased relay switch RS 561 to source line 554. Line 559 is also extended by line 562 to one side of a limit switch LS 563. RS 561 is equipped with contact pairs 564, 565 and 566 which, when engaged, complete circuits from source lines 551, 554 and source line 568 to the high-frequency induction heating source 521 via lines 569, 570 and 571. This serves to heat the metal insert presently disposed within the linear coil 523 to the required temperature, for example, about 1980° F. Simultaneously, line 559 completes a parallel circuit by line 572 through a pressure valve 496 to source line 554 which causes application of pressure from supply pipe 574 through pipe 575 to the head end of cylinder 487. Upon outward motion of piston rod 493, lever 488 by way of shaft 490 and lever 489 acts to advance the transfer bar 483 and deliver the metal insert 28 in hole 486 from beneath the end of tubing 477 to the area beyond the ledge 501 at which point it drops accurately onto the pin portion 418 of a support element 412 therebeneath. When the first functional phase of TR 553 terminates, solenoid 560 is deenergized to cause disengagement of contact pairs 564, 565 and 566 of RS 561 and halt the heating cycle. Opening of line 559 breaks the circuits of lines 562 and 572 to first open the circuit through LS 563 and, secondly, to permit valve 496 to reverse whereupon the spring 497 contained in cylinder 487 retracts piston rod 493 to move the bar 483 inwardly along the groove 482 until halted by stop screw 499 and the hole 486 positioned to receive a successive insert from the end of the tube 477.

As mentioned earlier in connection with line 555 from MS 550, a circuit is completed through solenoid 576 of RS 556 to source line 554. RS 556 is equipped with contact pairs 577 and 578 which when engaged (1) complete a circuit by line 579 through normally closed switch device LS 532 and the magnet 531 to source line 554 and (2) (contacts 578) create circuits for operation of the rotary unit 41 by line 580. Thus, while the second operational phase of TR 553, which phase is of "on-off" duration, is active, a circuit is made by line 581 through the solenoid 582 of relay switch RS 583 to source line 554; RS 583 having opposed solenoid 584, disengaged contact pair 585 and engaged contact pair 586. While energized, solenoid 582 acts to disengage contacts 586 and to engage contacts 585 to complete the circuit of line 580 by line 588 through the end 589 of valve 444 to source line 554. This will cause the direction of pressure from supply pipe 590 and pipe 445 to the head end of cylinder 441 and branch pipe 446 to the rod end of cylinder 447. As previously described, when the lock-bolt 434 is retracted from the teeth of ratchet 432, the pawl 433 will be advanced to move the rotatably mounted plate 411 by ratchet 432 the angular distance of 10°. Since solenoid 582 is then substantially instantaneously deenergized, the limit switch LS 563 can be closed at the limit of each stepwise movement of the ratchet 432 which will result in completion of a circuit from line 562 by line 591 through opposed solenoid 584 of RS 583 to source line 554; this serving to reengage contact pair 586 while disengaging contact pair 585. Contacts 586 complete a circuit from line 580 by line 592 through the opposed end 593 of the valve 444 to source line 554. This reverses the application of pressure from pipe 445 to pipe 449 connecting to the rod end of cylinder 441 and by branch pipe 450 to the head end of cylinder 447. Thus, by the predetermined limited stroke of the piston rod 443 to halt rotation of the plate 411, utility of the switch 463 can serve to retract the pawl 433 and advance the lock-bolt 434 while TR 553 is again active during a reoccurring first phase to produce heat fusion of the glazing composition of a subsequent insert while another insert is fed to a support element 412 at the loading station 46. Obviously, when this first phase ceases, the circuits of lines 559, 562 and 572 will be opened and particularly the solenoid 584 deenergized.

Now, during each step-wise rotation of the plate 411, the support element 412 engaging the free end or tip 547 of the lever 548 causes the same to open switch device 532. This will break the circuit of line 579 through the magnet 531 whereupon the metal insert attracted thereto will be permitted to fall into the receptacle 422.

If desired, upon arriving at a selected quantity of metal inserts to be glazed, MS 558 can be opened to break the circuit of line 557 to the vibratory device 474. This will halt spiralling movement of the train of inserts being supplied to the feeding unit 48. Consequently TR 553 can continue to periodically heat the inserts remaining on the support elements 412 of the plate 411 and deliver them to the unloading means 53 and the receptacle 422.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. A method of treating tubular metal inserts for use in forming dehydration holes in all-glass multiple sheet glazing units, which comprises (a) Impacting the metal insert with particles of hard glass to provide the surface of said insert with a layer of glass powder physically anchored thereto, (b) Heating the metal insert to a temperature sufficient to soften the glass powder to form a semifused coating on the insert and simultaneously develop a layer of oxide on the surface of said insert, and (c) Then heating the coated metal insert at an elevated temperature to completely fuse the glass coating to the insert without destroying the oxide layer therebetween.

2. A method as defined in claim 1, in which the heating of the metal insert and glass coating at an elevated temperature is effected by electric high-frequency induction heating.

3. A method as defined in claim 1, in which the metal insert and impacted powder glass are heated to a temperature of about 1180° F. for a period of about 15 to 20 minutes to provide a semi-fused glass coating, and in which the heating of the metal insert to an elevated temperature to completely fuse the glass coating is effected by electric high-frequency induction heating at a temperature of about 1980° F. for a period of about 2 to 3 seconds.

4. A method as defined in claim 1, in which the particles of hard glass impacted into the outer surface of the metal insert are of the same composition as that of the glass sheets of the multiple glazing unit.

5. Apparatus for handling and treating tubular metal inserts for use in forming dehydration holes in all-glass multiple sheet glazing units, comprising (a) a table mounted for rotation about a fixed axis (b) means carried by said table for supporting a plurality of said metal inserts in predetermined position and in spaced locations on said table.

(c) means for intermittently rotating said table to successively advance metal inserts on said support means to and away from spaced loading, heating and discharge areas arranged around said table, (d) means at said loading area for automatically feeding a succession of said inserts into said predetermined position and at said locations on said support means (e) and means at said heating area position to receive said inserts in operative relationship to heat the same as they move into said area.

6. Apparatus as defined in claim 5, in which (a) said supporting means for the metal inserts comprises a plurality of vertical support elements for successively receiving inserts thereon upon intermittent movement of the table, (b) said feeding means comprises a source of supply and means for successively delivering individual metal inserts from the source of supply onto the vertical support elements as the same are halted therebeneath, and (c) including means responsive to stopping of the table for actuating said feeding means.

7. Apparatus as defined in claim 6, in which (a) said heating means comprises an electric high-frequency induction heating coil for receiving successive vertical support elements, with metal inserts thereon, from said feeding means upon continued intermittent movement of the table, and (b) including means operable upon stopping of the table for automatically actuating the feeding means and the induction heating coil.

8. Apparatus as defined in claim 5, including unloading means at said discharge area mounted adjacent said table between said heating means and said feeding means for removing said metal inserts from said supporting means.

9. Apparatus as defined in claim 8, including means operable upon stopping of the table for automatically actuating said unloading means to remove the metal inserts from the supporting means upon continued intermittent movement of the table.

10. Apparatus as defined in claim 8, in which said supporting means comprises a plurality of vertical support elements for receiving metal inserts thereon, and in which said unloading means comprises magnetic means for lifting the metal inserts from the support elements as they are brought into position therebeneath.

11. Apparatus as defined in claim 5, including (a) unloading means comprising magnetic means for lifting the metal inserts from the support elements upon continued intermittent movement of the table, and (b) means operable upon stopping of the table for automatically activating said feeding means and said heating means and for energizing said magnetic unloading means.

12. Apparatus as defined in claim 11, including (a) electrical timing means for de-activating said feeding means and said heating means and for causing indexing movement of the table to advance an empty support element to the said feeding means and a support element with an insert therein to the said heating means, and (b) control means for de-energizing said magnetic unloading means during indexing movement of the table to discharge the metal inserts therefrom.

13. Apparatus as defined in claim 5, in which (a) said heating means comprises an electric high-frequency induction heating coil for receiving successive vertical support elements, with metal inserts thereon, from said feeding means, and (b) including unloading means comprising magnetic means for lifting the metal inserts from the support elements upon continued intermittent movement of the table, (c) means operable upon stopping of the table to automatically activate said feeding means and said heating means and for energizing said magnetic means, (d) electrical timing means for de-activating said feeding means and said heating means and for causing indexing movement of the table to advance an empty support element to the feeding means and a support element with an insert thereon to the heating means, and (e) control means for de-energizing said magnetic means during indexing movement of the table to discharge the metal insert therefrom.

14. Apparatus as defined in claim 13, in which (a) said contral means includes a switch device located adjacent to said table between said heating means and said unloading means, and (b) including lever means positioned to engage successive vertical support elements to open the switch device during indexing of said table to de-energize said magnetic means.

15. Apparatus as defined in claim 5 in which said heating means is a high-frequency induction heating system including a linear coil, and said coil is positioned to receive said inserts in the field thereof.

References Cited

UNITED STATES PATENTS

| | | | |
|---|---|---|---|
| 2,177,498 | 10/1939 | Payne | 65—59 |
| 2,622,861 | 12/1952 | Talley | 263—7 |
| 2,683,906 | 7/1954 | Nevins | 52—304 |
| 2,803,926 | 8/1957 | Ekkers | 65—42X |
| 3,027,607 | 4/1962 | Badger et al. | 52—304 |
| 3,141,753 | 7/1964 | Certa | 65—43 |
| 3,365,284 | 1/1968 | Alessi | 65—59 |

FOREIGN PATENTS

| | | | |
|---|---|---|---|
| 596,979 | 8/1959 | Italy | 65—59 |

DONALD A. GRIFFIN, Primary Examiner

U.S. Cl. X.R.

52—304; 65—59; 263—7